United States Patent
Demetrescu et al.

(10) Patent No.: US 6,791,944 B1
(45) Date of Patent: Sep. 14, 2004

(54) MOBILE TERMINAL AND BASE STATION IN A PACKET RADIO SERVICES NETWORK

(75) Inventors: Cristian Demetrescu, London (GB); Simon Fabri, Msida (MT); Said Tatesh, Swindon (GB)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/386,044

(22) Filed: Aug. 30, 1999

(30) Foreign Application Priority Data

| Sep. 2, 1998 | (GB) | 9819136 |
|---|---|---|
| Oct. 20, 1998 | (EP) | 98308584 |

(51) Int. Cl.[7] .............................................. G08C 15/00
(52) U.S. Cl. ..................................... 370/235; 370/348
(58) Field of Search ............................... 370/336, 337, 370/347, 348, 349, 229, 230, 235

(56) References Cited

U.S. PATENT DOCUMENTS

| 4,516,239 A | | 5/1985 | Maxemchuk | |
|---|---|---|---|---|
| 4,864,564 A | | 9/1989 | Parker et al. | |
| 4,887,265 A | * | 12/1989 | Felix | 370/333 |
| 5,299,198 A | | 3/1994 | Kay et al. | |
| 5,506,848 A | * | 4/1996 | Drakopoulos et al. | 370/336 |
| 5,642,354 A | * | 6/1997 | Spear | 370/329 |
| 5,659,541 A | * | 8/1997 | Chan | 370/236 |
| 5,742,640 A | * | 4/1998 | Haoui et al. | 375/220 |
| 5,757,772 A | | 5/1998 | Thornberg et al. | |
| 5,974,106 A | * | 10/1999 | Dupont et al. | 375/377 |
| 6,031,832 A | * | 2/2000 | Turina | 370/348 |
| 6,130,883 A | * | 10/2000 | Spear et al. | 363/131 |
| 6,240,083 B1 | * | 5/2001 | Wright et al. | 370/348 |
| 6,278,706 B1 | * | 8/2001 | Gibbs et al. | 370/352 |
| 6,359,904 B1 | * | 3/2002 | Hamalainen et al. | 370/469 |
| 6,438,122 B1 | * | 8/2002 | Monrad et al. | 370/349 |

FOREIGN PATENT DOCUMENTS

| EP | A-0841831 | 5/1998 | H04Q/11/04 |
|---|---|---|---|
| GB | 2 306 858 A | 5/1997 | H04B/7/26 |
| JP | A-09200265 | 7/1997 | H04L/12/56 |
| KR | 98-19518 | 6/1998 | H04L/12/28 |
| WO | WO 97/32441 | 9/1997 | H04Q/7/36 |
| WO | WO 98/44755 | 8/1998 | |

OTHER PUBLICATIONS

Jacobson, Compressing TCP/IP Headers for Low–Speed Serial Links, RFC 1144, Feb. 1990, pp 1–5.*

(List continued on next page.)

*Primary Examiner*—Chi Pham
*Assistant Examiner*—Keith M. George (57) ABSTRACT

A mobile terminal for communicating with a base station in a packet radio services network. The terminal has a processor for determining one of a plurality of channels for communication between the mobile terminal and the base station; for digitally coding speech to provide speech information; for assembling speech information into speech packets; and for generating channel allocation requests for a channel in which to send speech packets. A radio transmitter is provided for transmitting the requests and the packets to a base station in the network. A radio receiver receives identities of channels allocated by the base station for the mobile terminal to transmit on. The processor is responsive to each received channel allocation to determine that packets are sent on the allocated channel.

In the GPRS since a channel is released when there is no packet to transmit, higher traffic levels can be obtained using the same number of radio channels.

5 Claims, 9 Drawing Sheets

OTHER PUBLICATIONS

Nanda, Sanjiv, "Analysis of Packet Reservation Multiple Access: Voice Data Integration For Wireless Networks", *Proceedings of the Global Telecommunications Conference and Exhibition* (Globecom), US, New York, IEEE, vol. —, Dec. 2, 1990, pp. 1984–1988.

"Digital Cellular Telecommunications System (Phase 2+); General Packet Radio Service (GPRS); Mobile Station (MS)—Serving GPRS Support Node (SGSN); Subnetwork Dependent Convergence Protocol (SNDCP)", Jul. 1998, *European Telecommunications Standards Institute*, Valbonne—France.

Subbiah, B. et al., "User Multiplexing in RTP Payload Between IP Telephony Gateways", *Internet Engineering Task Force*, Aug. 21, 1998, pp. 1–17, XP–002127741.

European Search Report.

Japanese Office Action For Corresponding US Application Dated Feb. 23, 2004.

* cited by examiner

MOBILE TERMINAL AND BASE STATION IN A PACKET RADIO SERVICES NETWORK

CROSS-REFERENCE TO RELATED APPLICATION

This application claims priority of European Patent Application No. 9819136.4, which was filed on Sep. 2, 1998 and European Patent Application No. 98308584.6, which was filed on Oct. 20, 1998.

BACKGROUND OF THE INVENTION

1. Field of the Invention

This invention relates to packet radio services networks.

2. Description of the Related Art

Standards are being defined for a general packet radio services network (GPRS)

SUMMARY OF THE INVENTION

The invention is based on the recognition that if suitably designed a packet services network could carry speech.

To this end, in accordance with the invention there is provided a mobile terminal for communicating with a base station in a packet radio services network, said terminal including a processor for determining one of a plurality of channels for communication between the mobile terminal and the base station; for digitally coding speech to provide speech information; for assembling speech information into speech packets; and for generating channel allocation requests for a channel in which to send speech packets; a radio transmitter for transmitting the requests and the packets to a base station in the network; and a radio receiver for receiving identities of channels allocated by the base station for the mobile terminal to transmit on, said processor being responsive to each received channel allocation to determine that packets are sent on the allocated channel.

In the GPRS since a channel is released when there is no packet to transmit, higher traffic levels can be obtained using the same number of radio channels.

Preferably, if a request to send is not granted, the processor is arranged to discard speech information until a further request is granted. As speech is highly time sensitive, it is better to discard the information than to send the information delayed. The discard produces clipping which, as long as it is not too frequent, is tolerable by the user.

The processor is preferably arranged so that when a request to send is not granted, a further request is delayed by a predetermined period.

The delay is preferably increased if successive requests are not granted.

Following a predetermined maximum delay, the delay is reduced.

The processor is preferably arranged to implement a layered protocol in which each packet is given a header in a subnetwork dependent convergence protocol layer (SNDCP).

Because of the time sensitive nature of speech the header is preferably a RTP/UDP/IP header.

The mobile terminal preferably includes a voice activity detector, and the processor is preferably responsive to detection of voice activity by the voice activity detector, to generate a request for a channel allocation in which to send voice packets, and on receipt of a channel identity, to send the an address header uncompressed on that channel once and subsequently to send packets with compressed headers which do not contain the destination address on the identified channel, until the voice activity detector detects no voice activity.

The processor is preferably arranged to construct packets of an equal number n of frames, the processor being further arranged to implement a logical link layer protocol (LLC) which adds its own LLC header information comprising a service access point identifier defining speech service to each packet, and to divide the total LLC plus SNDCP header into n parts of equal length and to place one header part before each frame in the packet. This provides that every frame in the packet has the same format and allows a common protection strategy to be applied to each frame. The header information can be given an error correcting code. Speech is more error tolerant, however. More important parts of the speech information can be coded in order to identify that there is an error, in which case the frame is discarded. Less important parts of the speech information can be left unprotected.

Thus, in the physical layer, in each frame, the header and the most important bits speech information are preferably coded using a convolutional code, and a subset of the important bits of the speech information are coded using a cyclic redundancy check.

The invention also extends to a base station including a radio receiver for receiving requests from mobile stations to send data packets and requests to send speech packets and operable on a plurality of channels to receive data packets and speech packets; a processor for reserving a predetermined number of said channels for receiving coded speech packets, and for allocating nominating a free one of said predetermined number responsive to a request channel allocation request in which to send a speech packet; and a transmitter for transmitting the allocated channel to the mobile station.

By dynamically managing the number of channels reserved for speech, optimum service can be given to both speech services and to data services given changing respective demands.

The invention also extends to a base station including a radio receiver for receiving requests from mobile stations to send data packets and requests to send speech packets and operable on a plurality of channels to receive data packets and speech packets; a processor for nominating channels for a mobile station to send speech packets and for processing packets in a talk spurt comprising a single destination address header followed by a plurality of speech packets not containing a destination address, for transmission over the network.

The invention further extends to a base station including a radio receiver for receiving requests from mobile stations to send data packets and requests to send speech packets and operable on a plurality of channels to receive data packets and speech packets, a processor for implementing a protocol which recovers network and transport layer headers and logical link layer headers for a packet, from equal parts of each frame in the packet.

The processor may be operative in each frame to correct errors in the header and the most subjectively important bits of the speech information only.

BRIEF DESCRIPTION OF THE DRAWINGS

One embodiment of the invention will now be described, by way of example, with reference to the accompanying drawings, in which.

DETAILED DESCRIPTION

Figure 1:
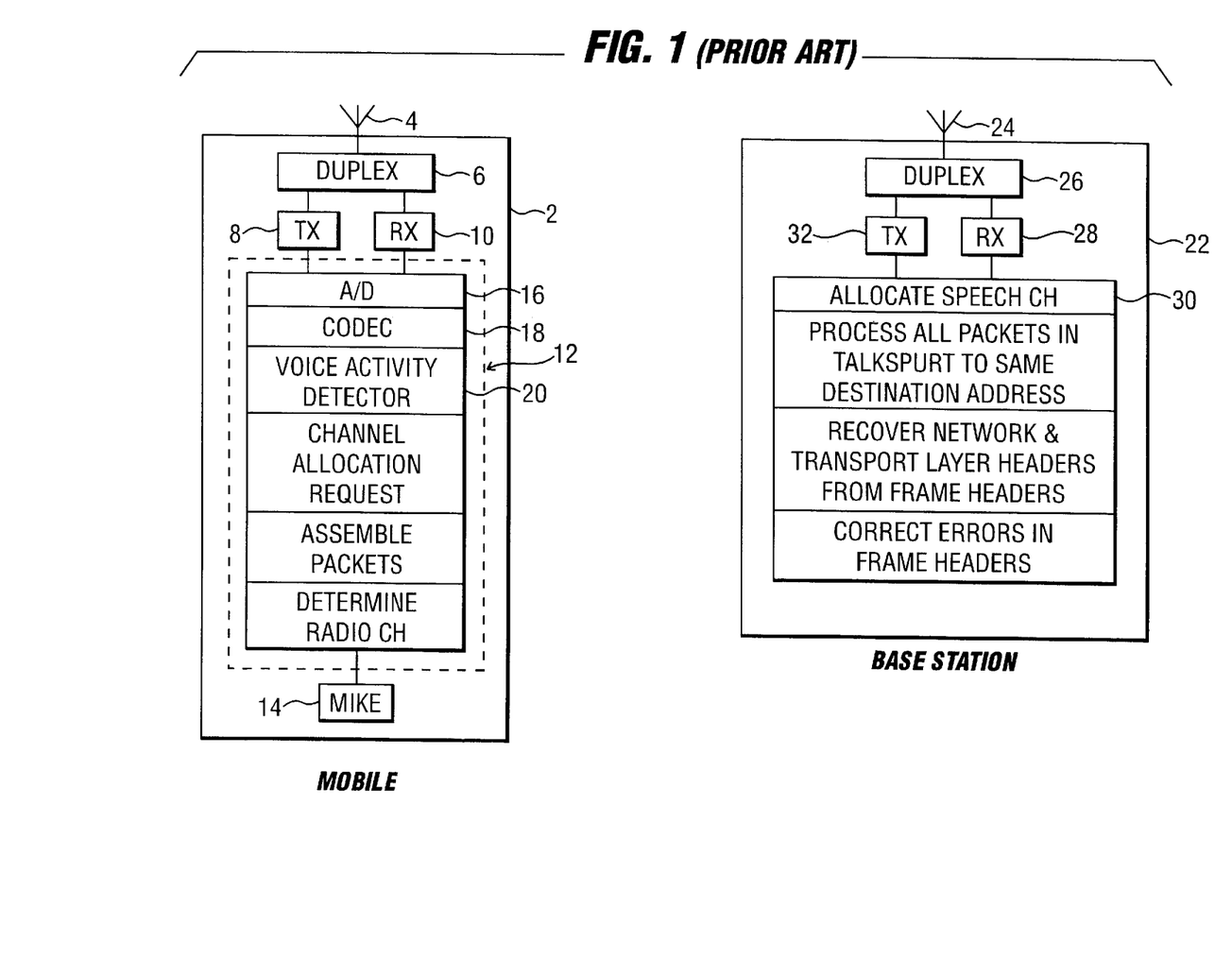
FIG. 1 is a block diagram of a GPRS mobile terminal and base station embodying the invention.

Referring to the drawings, a mobile terminal 2 has an antenna 4 coupled to a duplexer 6. The duplexer 6 is coupled to a transmitter 8 and a receiver 10. Signals received by the receiver 10 are fed to a processor 12. Sound waves of speech are transduced to analog electrical signals by a microphone 14 and the analog signals are converted to digital by the processor which may have one or more central processing units (not shown). An analog to digital converter may be a self contained unit 16. The processor processes the digitized speech which is then coded by a parametric codec algorithm, e.g. EFR, to produce speech frames. A codec may be a self contained unit 18.

A voice activity detector algorithm detects the presence of speech distinguished from silences. The voice activity detector may be a self contained unit 20. When speech is detected, the processor assembles speech information output from the codec with network and transport layer headers into fixed length packets of two frames and sends a channel allocation request.

Figure 2:
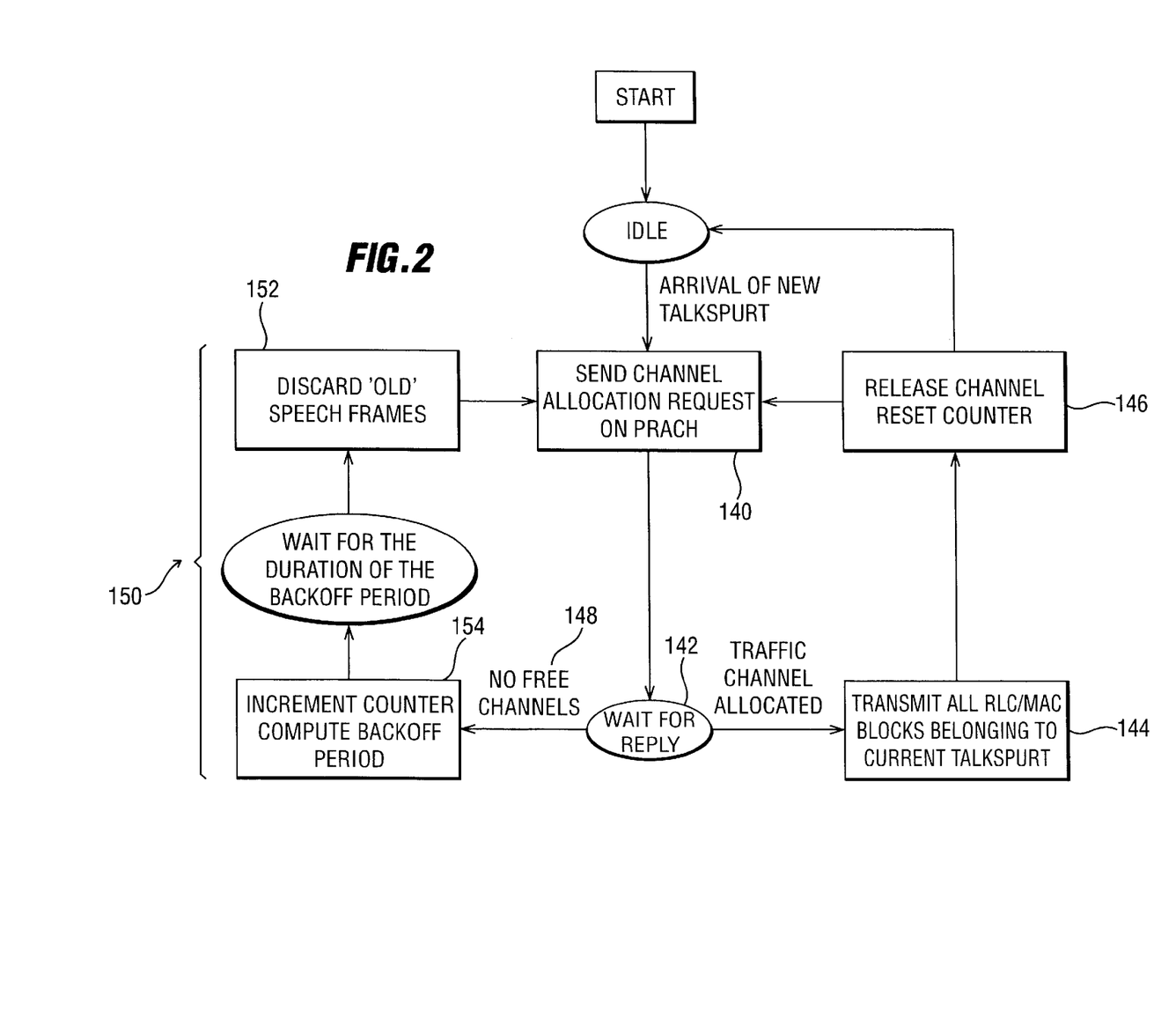
FIG. 2 shows schematically the operation of RLC/MAC protocol.

As may be seen from the block diagram of FIG. 2, if the channel allocation request is refused, a delay is introduced before a new request is sent and speech frames to occurring during the delay are discarded.

A base station 22 has an antenna 24 feeding a duplexer 26. A radio receiver 28 sends packets received from the mobile terminal 2, to a processor 30. Data for transmission to the mobile terminal 2 is sent to a radio transmitter 32 coupled to the duplexer 26.

Figure 3:
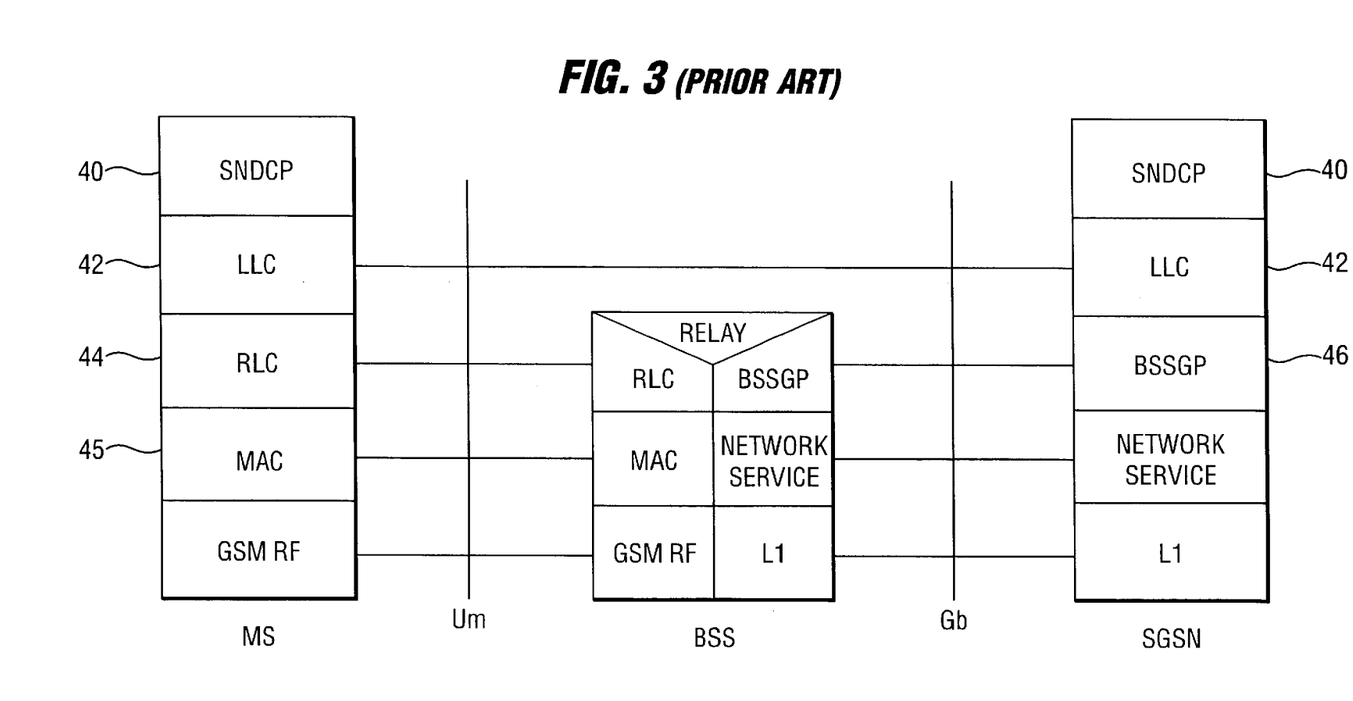
FIG. 3 shows network layer protocol layers.

Network layer protocols, illustrated in FIG. 3, are intended to be capable of operating over services derived from a wide variety of subnetworks and data links. GPRS was designed from the outset to support several network layer protocols providing network transparency for the users of the service. Introduction of new network layer protocols to be transferred over GPRS was to be allowed without any changes to the GPRS network, a function carried out by the subnetwork dependent convergence protocol (SNDCP). In addition, SNDCP 40 carries out header and data compression, and multiplexing of data coming from different sources to be sent over the LLC layer 42.

IP is used as the network protocol with RTP being used to provide support for the real time streaming by supplying timestamp information and packet sequencing. SNDCP currently only provides for TCP/IP and EP(v4) header compression by implementing the RFC1144 compression algorithm. However, the SNDCP specifications also allow for additions to the list of supported compression protocols, according to the requirements of new applications and services. The present system employs the RTP/UDP/IP protocols which involve an overhead of 40 octets, corresponding to 320 bits.

Using packets of two frames length, it is necessary to support some form of compression for these transport and network layer headers. Indeed, if the CS-I channel coding scheme were to be used, the combined RTP/UDP/IP headers would occupy the entire information payloads of two radio blocks, leaving no space for any speech information or logic link control (LLC) headers.

A high compression efficiency may be obtained by treating the IP/UDP and RTP headers together rather than separately. Although it is contrary to the ethos of layered architecture, crossing these protocol layer boundaries is appropriate because the same function is being applied across all layers.

There are two main properties of the transmitted packets which are used to carry out header compression. The first factor-of-two reduction in data rate comes from the observation that half of the bytes in the headers remain constant over the life of the connection. An obvious example is the source and destination addresses and ports. The uncompressed header is sent once, during a connection establishment phase. These fields are then deleted from the compressed headers that follow without any real loss of information.

The remaining compression comes from differential coding on the changing fields to reduce their size. In particular, for RTP header compression, a big gain in efficiency comes from the observation that although several fields change in every packet, such as the sequence number and the timestamp, the difference from packet to packet is often constant, and therefore the second-order difference is zero. By making use of these properties, the massive combined RTP/UDP/IP header can be reduced to two bytes or three bytes, depending upon whether a header checksum is used. As at least part of the end-to-end link includes at least one mobile propagation path, which is by its very nature subject to error, it would be useful to include the header checksum in the scheme employed. Although it is not be used for error correction or frame retransmission schemes, it gives an indication that part of the header may be corrupted and to ignore the timing information for that particular packet.

SNDCP also supports data compression by means of the V.42 bis data compression algorithm. However, as the application layer which sits above the SNDCP layer already includes a lossy source coder in the form of a speech codec, there stands little to be gained by applying data compression by means of entropy coding, as most redundancy in the original information would have been already extracted. In addition, source coding modifies the speech coder bit patterns and makes it difficult to apply differential channel coding to the speech frame according to the subjective importance of the different bit positions.

Figure 4:
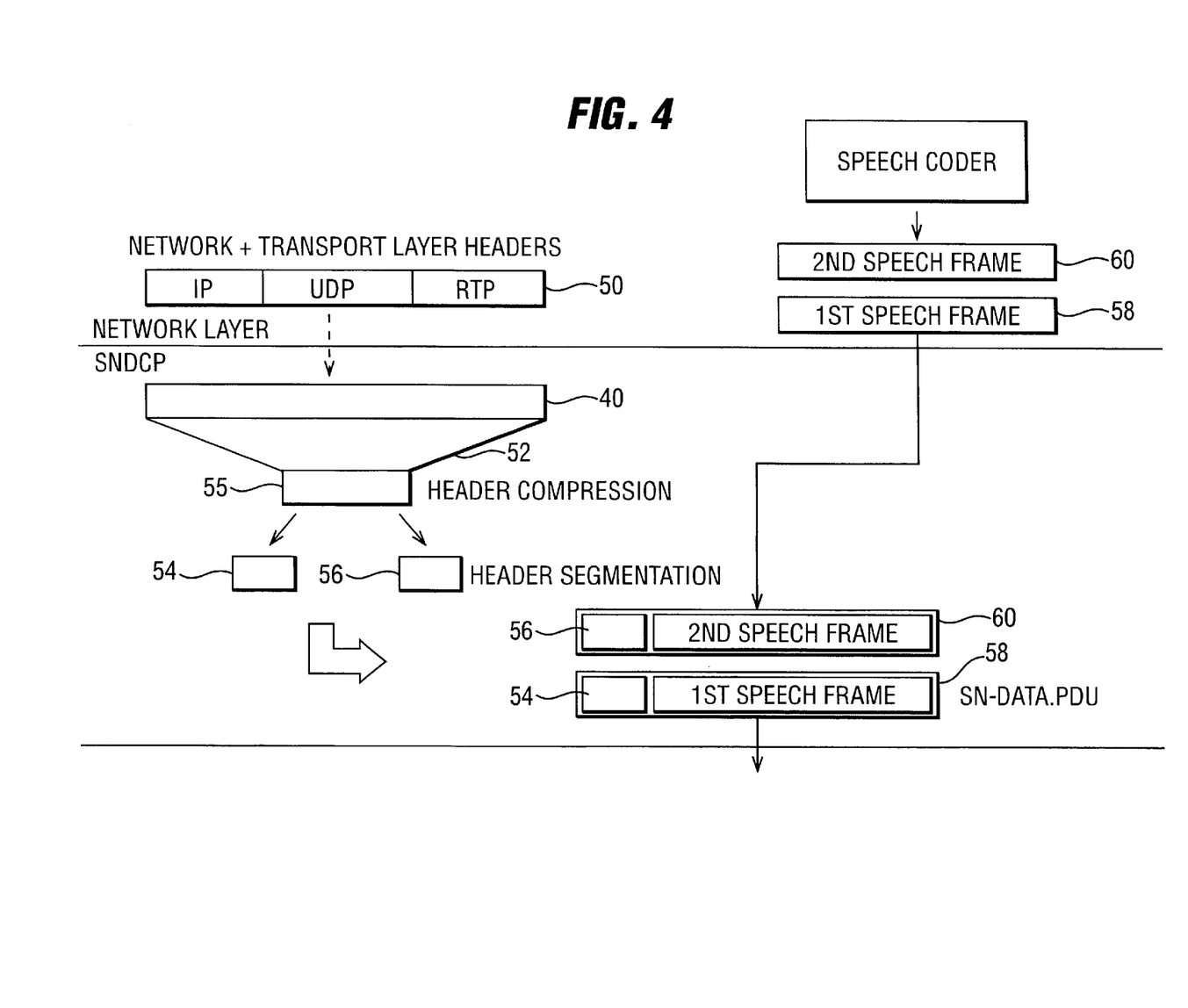
FIG. 4 shows the SNDCP model operation to support voice.

FIG. 4 shows the SNDCP model operation to support voice. Analysis of the Voice over GPRS delay budget showed that maximum payload efficiency can be achieved by encapsulating two speech frames into a single network packet. Increasing the number of speech frames accommodated by a single network packet brings about a proportional increase in the packet buffering delay, thereby increasing the maximum end-to-end delay threshold of 200 ms.

The SNDCP layer 40 therefore accepts the combined RTP/UDP/IP headers 50 and the speech frames through two different service access points. Header compression 52 is carried out, and the resulting header 55 segmented into two sections 54, 56 for addition to the two speech frames 58, 60 that is encapsulated into that particular packet. This system allows for the two radio link control (RLC) blocks containing the speech information to have exactly the same layout, and therefore use exactly the same channel coding scheme for both blocks. As the forward error correction is tailored to catering for the properties of a particular speech coder, it is important to ensure that each bit position with a radio block refers to the same bit position within a speech frame for all transmitted blocks. The first received speech frame belonging to a particular network packet is forwarded directly to the lower layer without waiting for the second frame to arrive.

The Logical Link Control layer 42 operates above the RLC 44 and BSSGP 46 layers in the illustrated architecture to provide highly reliable logical links between a mobile terminal and its serving GPRS support node (SGSN). Its main functions are designed towards supporting such a reliable link and they include sequence control of LLC frames across a logical link, the detection of transmission, format and operational errors on logical link connection, the notification of unrecoverable errors and flow control.

Figure 5:
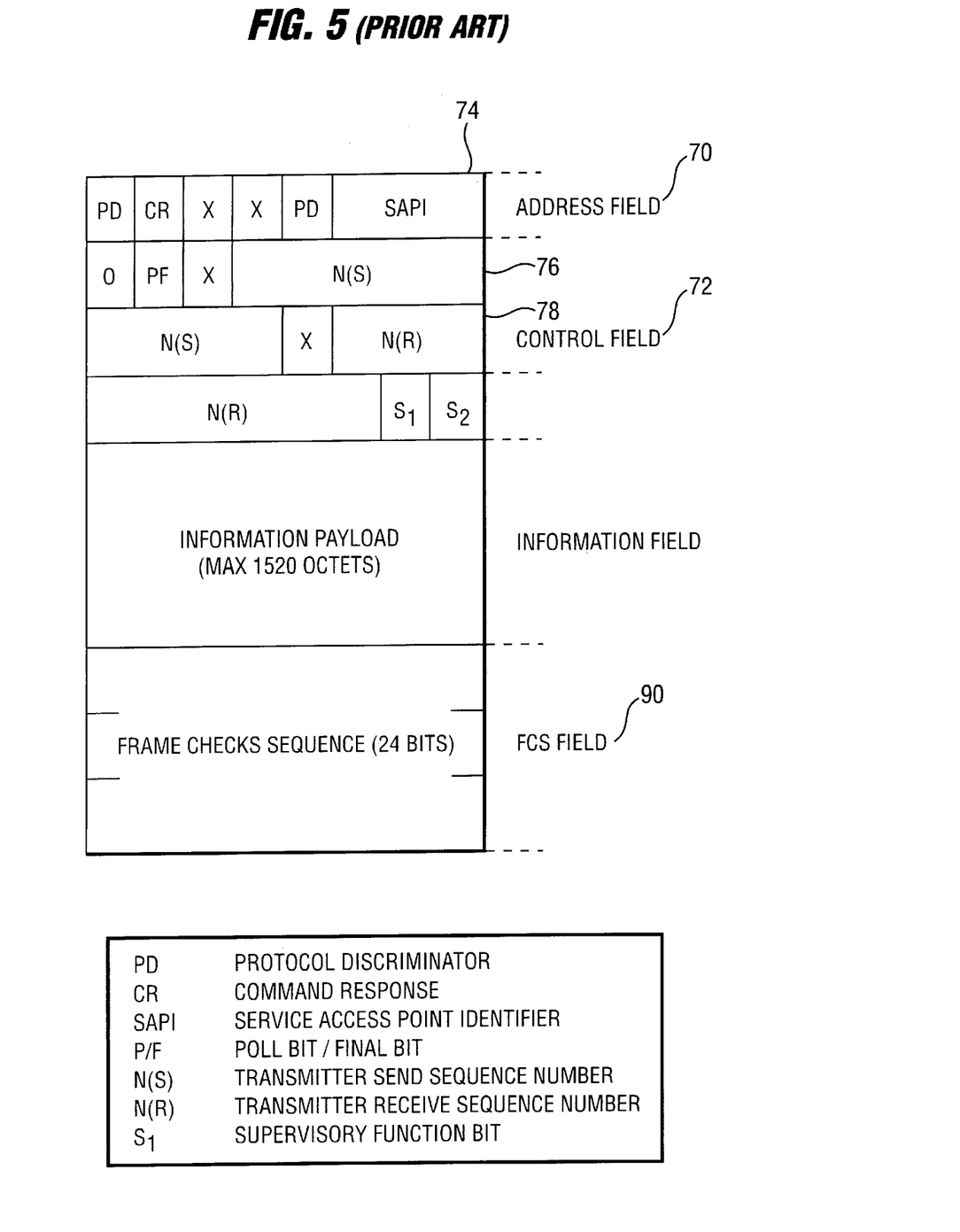
FIG. 5 shows the format of an LLC-PDU.

The operation of the LLC protocol can be better understood by examining the format of an LLC-PDU shown in FIG. 5.

As can be seen, the LLC frame header is divided into two main sections, the Address Field 70 and the Control Field 72. In the Address field is the Service Access Point Identifier (SAPI) 74. This represents a point at which LLC services can be accessed and provides a means by which the Quality of Service priority can be defined. As ten out of a possible sixteen different identifiers currently remain vacant in the specifications, a new SAPI can be defined for voice services, instructing the layers above, namely the SNDCP and the BSSGP about the priority required by voice packets over data traffic. The conventional control field contains two sub-fields, represented by N(S) 76 and N(R) 78, whose function it is to determine the position of a particular LLC frame within a sequence of frames constituting a single network PDU. However, this function is superfluous within the context of the Voice over GPRS system there is no segmenting of network-PDUs, as each N-PDU fits exactly into a single LLC-PDU. These fields are therefore to be omitted within the context of transporting real-time voice packets, without any loss of functionality. Each LLC-PDU conventionally ends with a 24-bit long footer containing a frame check sequence. This enables the LLC layer 42 to ensure that the LLC frame is free of errors (within the capabilities of the CRC check) before passing it on to the network layer at the SGSN for delivery through the backbone network. Should errors be found, it signals for retransmission by means of the RLC layer 44 selective repeat request system. However, as repeat request systems are not used in the present implementation, and as there already exists a cyclic redundancy check at the physical layer, the FCS field 90 within the LLC-PDU is also omitted without affecting the functionality of the system when transporting speech services. Indeed, should this field be retained, it would be merely ignored by the receiving process, as even if errors were to be detected, the process would still forward the packet, because as already described, coded speech has an inherent information corruption tolerance.

The system therefore accepts the two segments of the SNDC-PDU containing the two speech frames which belong to the same network packet, and add the new, 8-bit LLC header containing the SAPI for voice services to the first arriving segment so that the two frames in the packet have headers of equal length. This is then forwarded to the RLC 44/MAC 45 layer for immediate dispatch over the radio interface. When the peer LLC process at the BSS receives the first radio block containing information from that particular LLC-frame, it identifies that it contains speech information by examining the service access point identifier. This information instructs the process not to look for further header information after the first 8 bits, and not to expect any frame check sequence. The space freed by removing these fields is used to carry more user payload information.

The RLC/MAC (medium access control) layer provides services for the transfer of upper layer PDUs using a shared medium between multiple mobile stations and the network. This transfer may take place in the form of unacknowledged operation or acknowledged operation, according to the nature of the service required. As its very name implies, the RLC/MAC protocol actually consists of two separate protocols with different functions. The Radio Link Control Layer defines the procedures for segmentation and reassembly of LLC PDUs into RLC/MAC blocks and in RLC acknowledged mode of operation, for the Backward Error Correction (BEG) procedures enabling the selective retransmission of unsuccessfully delivered RLC/MAC blocks. When operating in the RLC acknowledged mode, the RLC layer preserves the order of higher layer PDUs provided to it. On the other hand, the MAC (Medium Access Control) function defines procedures that enable multiple mobile stations to share a common transmission medium which may consist of several physical channels. The GPRS MAC protocol allows for a single user to use more than one timeslot concurrently so as to increase throughput. In addition, the same timeslot may be multiplexed between up to eight users, so as to increase the number of users operating on a given set of system resources. In the Voice over GPRS system, there is no provision for multislotting, and for the duration of time for which a channel is occupied by a single user transmitting speech information, this channel is not multiplexed with any other users. In addition, no use is made of the retransmission functions of the RLC layer GPRS shares the same radio interface as the GSM circuit-switched voice system. This means that each physical frequency channel is divided into eight traffic channels by means of time-division multiplexing. Each timeslot within a TDMA frame can be dynamically allocated to GPRS services or GSM services according to the relative shifts in demands for the two services, with those channels allocated to packet data traffic being referred to as Packet Data Channels (PDCH)

Figure 6:
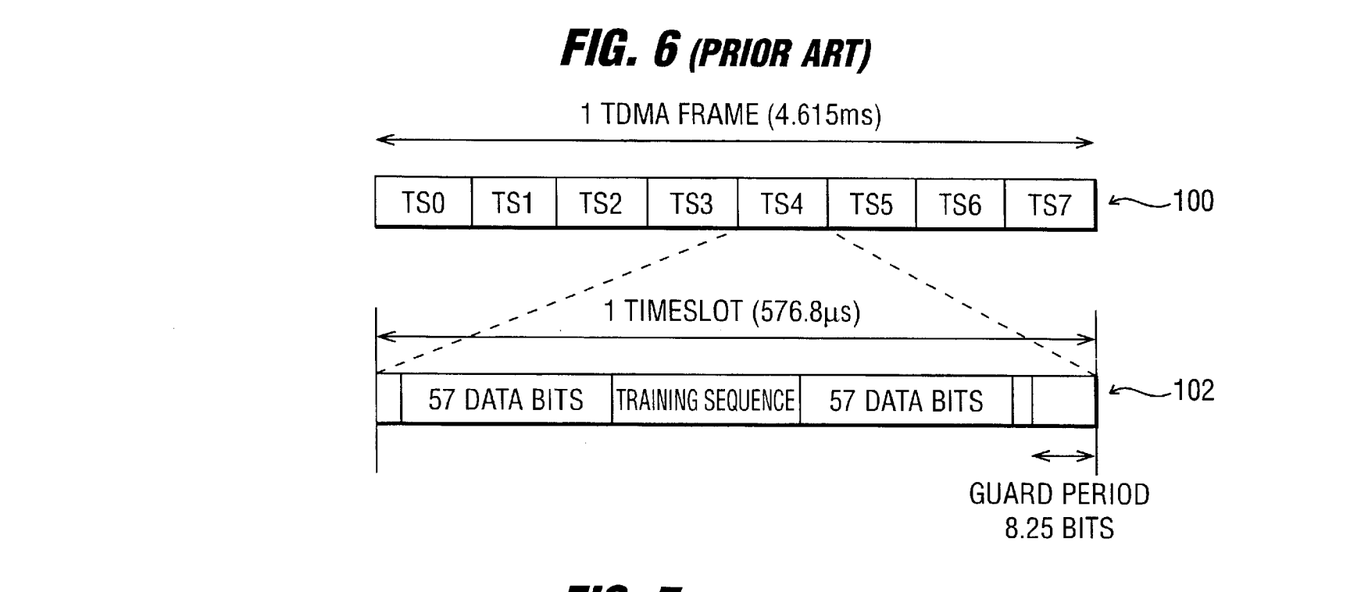
FIG. 6 shows the organization of TDMA frames in GPRS.

Each time division multiple access (TDMA) frame 100 lasts for 4.615 ms and can accommodate eight PDCHs within its eight timeslots 102. The data to be transmitted by means of the Packet Data Traffic Channels (PDTCH) is segmented into units of 114 bits each, which are then encapsulated into radio bursts for insertion into a single TDMA timeslot which lasts for 576.8 us. This means that each RLC/MAC block consisting of 456 bits is segmented and interleaved into four consecutive radio bursts.

GPRS multiplexing differs from that found GSM circuit-switched speech in the way the TDMA frames are organized into multiframes. Whereas GSM supports 26-frame and 51-frame multiframes, in GPRS the TDMA frames are organized into 239.980 ms-long multiframes 104 consisting of 52 frames. This organization is divided into 12 radio blocks of four frames each, and four idle frames as shown in FIG. 6.

Figure 7:
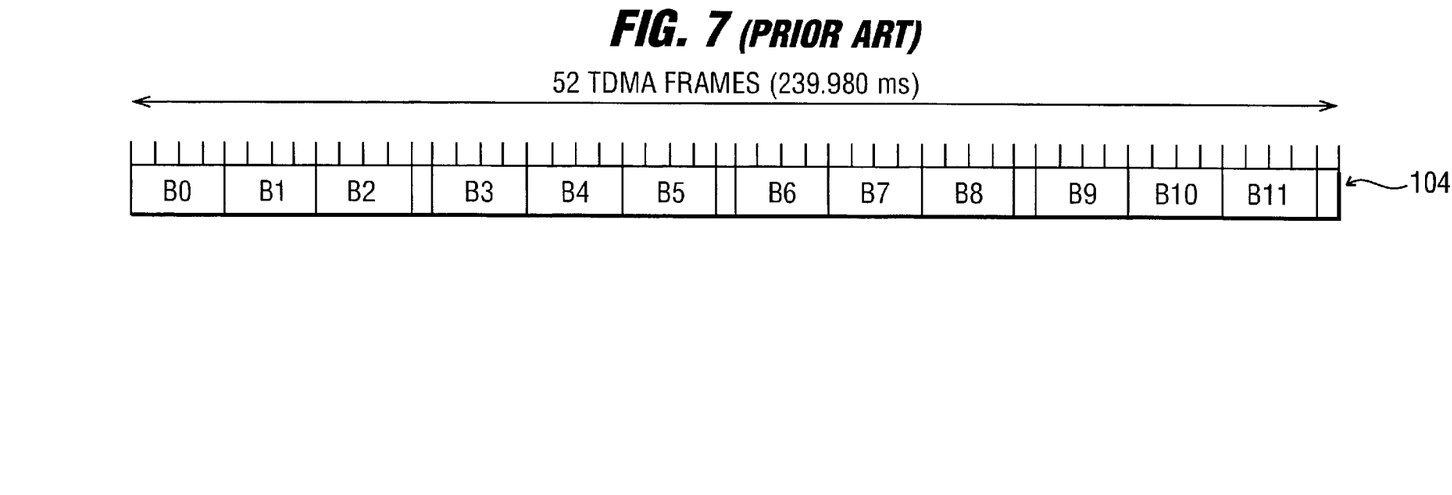
FIG. 7 shows the GPRS TDMA multiframe structure.

Referring to FIG. 7, it should be noted that all 52 bursts in the picture belong to the same timeslot, and consequently to the same PDCH. In GPRS, several logical channels not found in GSM circuit-switched services are introduced and accommodated onto the GSM physical channels (PDCH)

Figure 8:
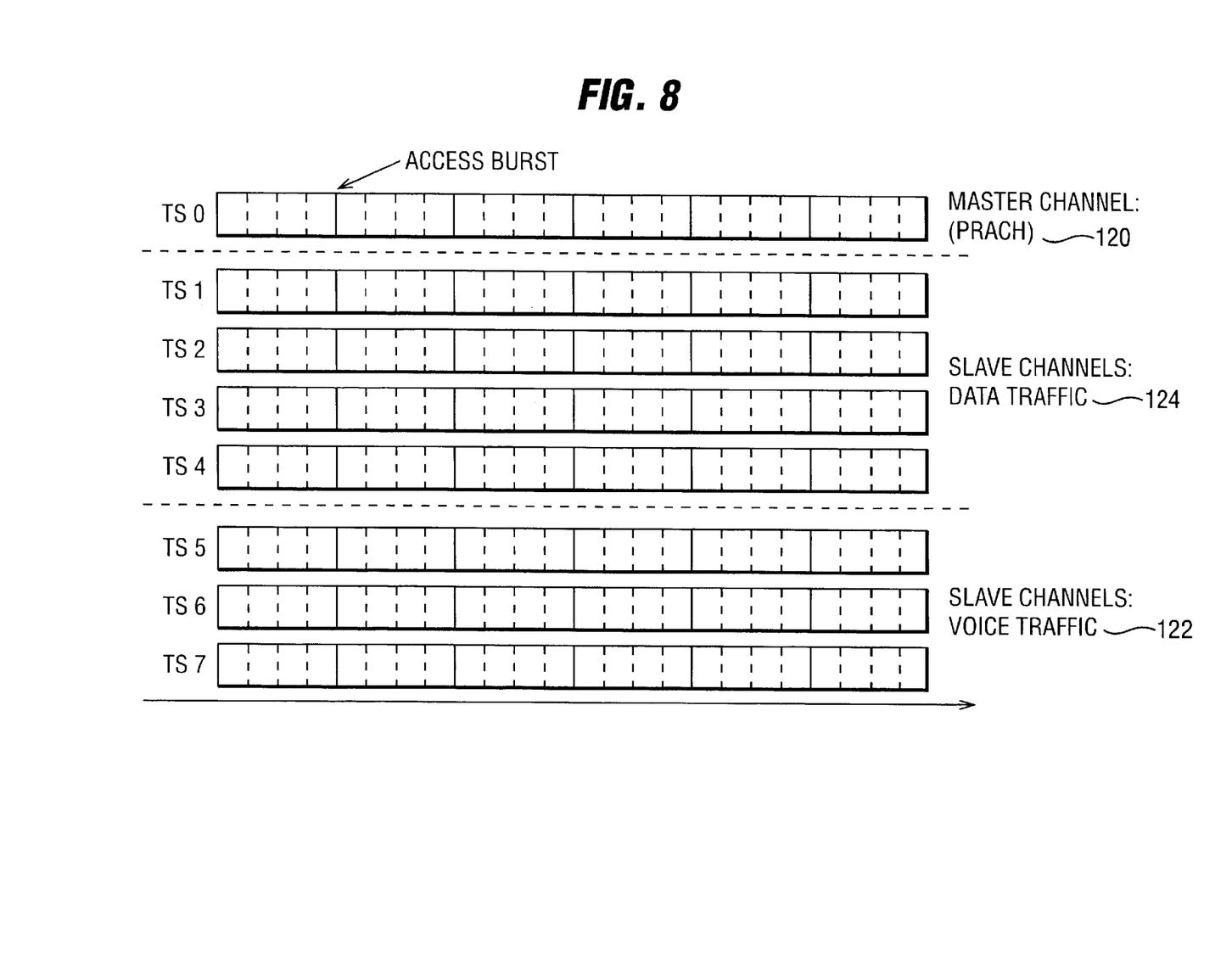
FIG. 8 shows the partition of channels in a GPRS carrying speech.

Referring to FIG. 8, the Packet Data Traffic Channel, which is used to actually carry the speech information and the Packet Access Grant channel which is used for channel contention are mapped onto the PDCH by what is known as the 'Master-Slave' concept. In this system, at least one PDCH (or timeslot), acting as a master, accommodates user data and dedicated signaling, and packet common control channels that carry all necessary control signaling for initiating packet transfer. Such control signaling refers only to the access bursts on the packet random access channel (PRACH) 120. All other PDCHs, acting as slaves are used for user data transfer and dedicated signaling only.

For GPRS the master channel is capable of bearing both the PRACH and a PDTCH simultaneously by sharing the physical channel between the two logical channels by means of a time-division multiplexing mechanism. Usually, the bulk of the physical resources of the Master timeslot are allocated to carrying user data, with one block every t blocks being dedicated to supporting random access attempts, where t is typically an integer with value 3, 4 or 5. In this way, whereas seven slave channels are entirely dedicated to supporting voice and data traffic, the eighth channel, which is usually time slot zero (TSO) is used both as a traffic channel, and as a random access medium for all terminals operating at that particular radio frequency channel.

The present implementation for supporting voice services requires that the master channel be left for control signaling only and not be allowed to accept any PDTCHs. The reason for making such a reservation is the extra delay that sharing the master channel would impose on the average access time. If, for example, t was set to three, one radio block out of every three available radio blocks in the master channel would be dedicated to supporting the PRACH. This means that a mobile terminal has to wait approximately 3 RLC blocks, equivalent to 55.3 ms until it is allowed to fire the next random access. This extra delay is clearly desirable for real-time voice services.

The remaining seven slave channels are then divided into those Packet Data Traffic Channels dedicated to voice services 122 and those dedicated to data services 124. The system does not allow a PDTCH to share voice and data services, as the delay requirements are radically different. By allowing GPRS voice users access to channels dedicated to carrying voice services, better control can be made by the base station to ensure that the required Quality of Service over the radio link in terms of access delay and speech frame loss rate are met.

The operation of the RLC/MAC protocol is summarized in FIG. 2. If a GPRS-terminal is voice-capable and wishes to initiate a conversation over the GPRS network, it initiates a call-setup procedure. In this process, that the Base Station monitors the current load in the cell of operation of the user and determine if it can support another voice user. If it can, the base station informs the mobile terminal that it has been admitted to the network and may initiate transmission of voice packets. The mobile terminal then goes into an idle mode where it waits for an indication from the terminal's voice activity detector (VAD) that a speech activity has been detected and a talkspurt has begun. A random access burst is sent over the PRACH 140, and it waits for a reply from the Base Station over the PAGCH 142. If channel resources are available, it indicates to the MS that it has allocated a single channel for the transmission of the talkspurt. In order not to be any more channel inefficient than the equivalent GSM circuit-switched voice services, multi-slotting is not enabled for the transmission of voice services over GPRS. This means that a single talkspurt may be transmitted in a single timeslot only, and the base station does not allocate more than this single PDTCH for this purpose. The mobile terminal then proceeds to transmit all the RLC/MAC blocks belonging to that particular talkspurt 144. On the onset of the following silence period, the mobile station stops transmitting RLC blocks, thereby indicating to the BS that it is releasing the channel 146. This means that channel contention occurs at the beginning of each talkspurt only, and once a terminal has acquired use of a traffic channel, it only relinquishes it when all the LLC frames corresponding to that particular talkspurt have been transmitted. The Base Station then allocates this channel to the pool of channels available for the transmission of voice services. If, however, there are no available PDTCHs allocated for the support of voice services, the BS informs the MS of the situation 148. The mobile station then enters a random exponential backoff period, at the completion of which it reattempts to access the channel 150.

As real-time speech is time-sensitive information, all the RLC/MAC blocks corresponding to speech frames generated during the backoff, save the most current one are discarded 152. For every failure to access the channel, a counter is incremented 154 and used to determine the duration of the backoff period. If however a collision occurs between access bursts in the same timeframe on the PRACH, the Base Station is not able to determine which MS initiated the request, and so is unable to respond. The mobile terminal notices that such a collision has occurred by employing a time set to a value slightly longer than the average response time of the base station. Should this value expire, the mobile station enters the backoff period in the same way as when channel access has been denied.

Both data terminals as well as voice terminals implement an exponential backoff algorithm, where after an unsuccessful access attempt, a uniform distributed random number w $\in [0, 2_{n+1}]$ is drawn, where n is the number of access attempts. For data terminals, the next random attempt is tried after a waiting time of w*8.5 ms, while for voice terminals, multipliers of 4.615 ms and 8.5 ms respectively are used.

As real-time conversational voice is a delay-critical service it is important that the medium access algorithm is geared towards keeping the access delay of the system to a minimum. A uniform distributed random number is selected from the range $[0, 2_{n+1}-1]$ The two parameters which when varied can alter the delay performance of the system are the maximum increment allowed, n, and a constant by which the random variable is multiplied in order to obtain the waiting time. Experiments have been carried out with an unbounded exponential backoff, meaning that no limit was set to the value of the increment counter, and with a time multiplier of one radio block, corresponding to 18.5 ms. The experiments however showed that system performance could be improved by fixing n to an upper limit of 5, and reducing the time multiplier to the duration of a single TDMA frame, i.e. 4.615 ms.

The physical RF transmits information bits over the radio path and deals with issues such as the carrier frequency characteristics and GSM radio channel structures, the modulation of transmitted waveforms and the transmitter and receiver characteristics and their respective performance requirements. GPRS shares all these specifications with the GSM speech standards, and as a consequence can make use of much of the current GSM radio infrastructure.

The Physical Link Layer operates above the physical RF layer to provide a physical channel between the mobile terminal and the Base Station Subsystem (BSS). One of its main responsibilities is forward error correction coding (FEC), which allows for the detection and correction of transmitted code words and the indication of uncorrectable code words. In addition, the physical link layer carries out rectangular interleaving of radio blocks over four bursts in consecutive TDMA frames, and procedures for detecting physical link congestion.

GPRS currently supports four channel coding schemes, ranging from a half-rate convolutional scheme (CS-I) to a scheme which provides for no channel coding (CS-4)

Schemes CS-2 and CS-3 are punctured versions of the CS-I scheme, giving resulting code rates of approximately 2/3 and 3/4 respectively.

When deciding which of the currently available coding schemes to use to protect coded speech, it is desirable to examine the speech coding techniques used to protect speech in circuit-switched GSM systems. As an example, we prefer to use the new GSM Enhanced Full Rate Coder (EFR). This is an Algebraic Codebook Excited Linear Predictive (ACELP) coder. It is essentially a parametric, rather than a waveform coder. This means that the speech is represented by a number of parameters describing, amongst other things, the pitch period of the speech, a number of LPC coefficients representing the waveform shaping effects that occur in the vocal tract and a description of the excitation that is generated by the speaker's vocal chords. Though these parameters are generated so as to maximize the coder efficiency by bringing to a minimum the redundancy present in the information being transmitted, not all parameters have an equal effect on the perceptible audio quality of the speech. This means, that when in error, some parameters, and consequently bits, cause a greater distortion in speech quality than other bits. This phenomenon is exploited when protecting the source coded bits by means of FEC.

Figure 9:
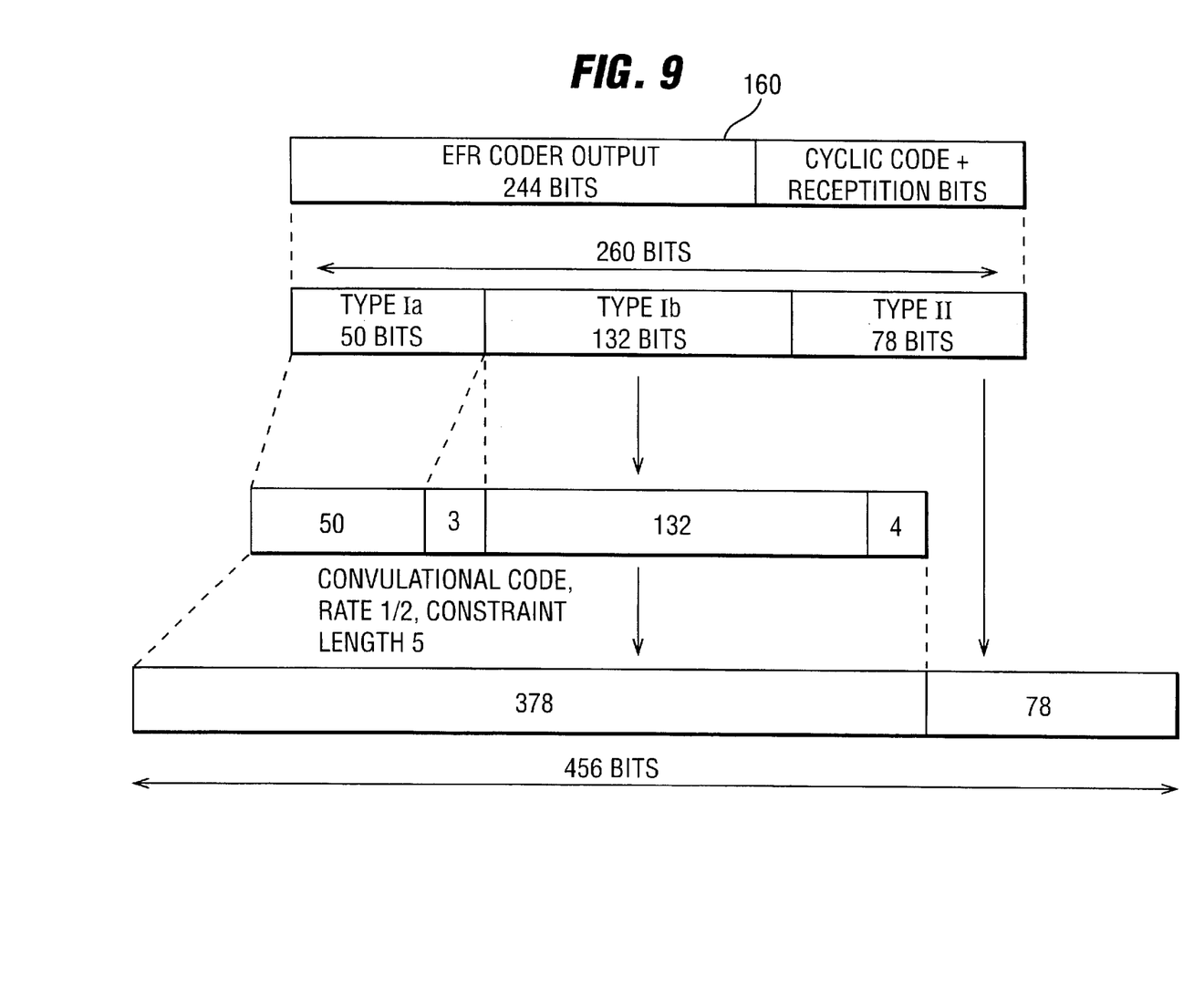
FIG. 9 shows how source coded bits output from the codec are protected.
Figure 10:
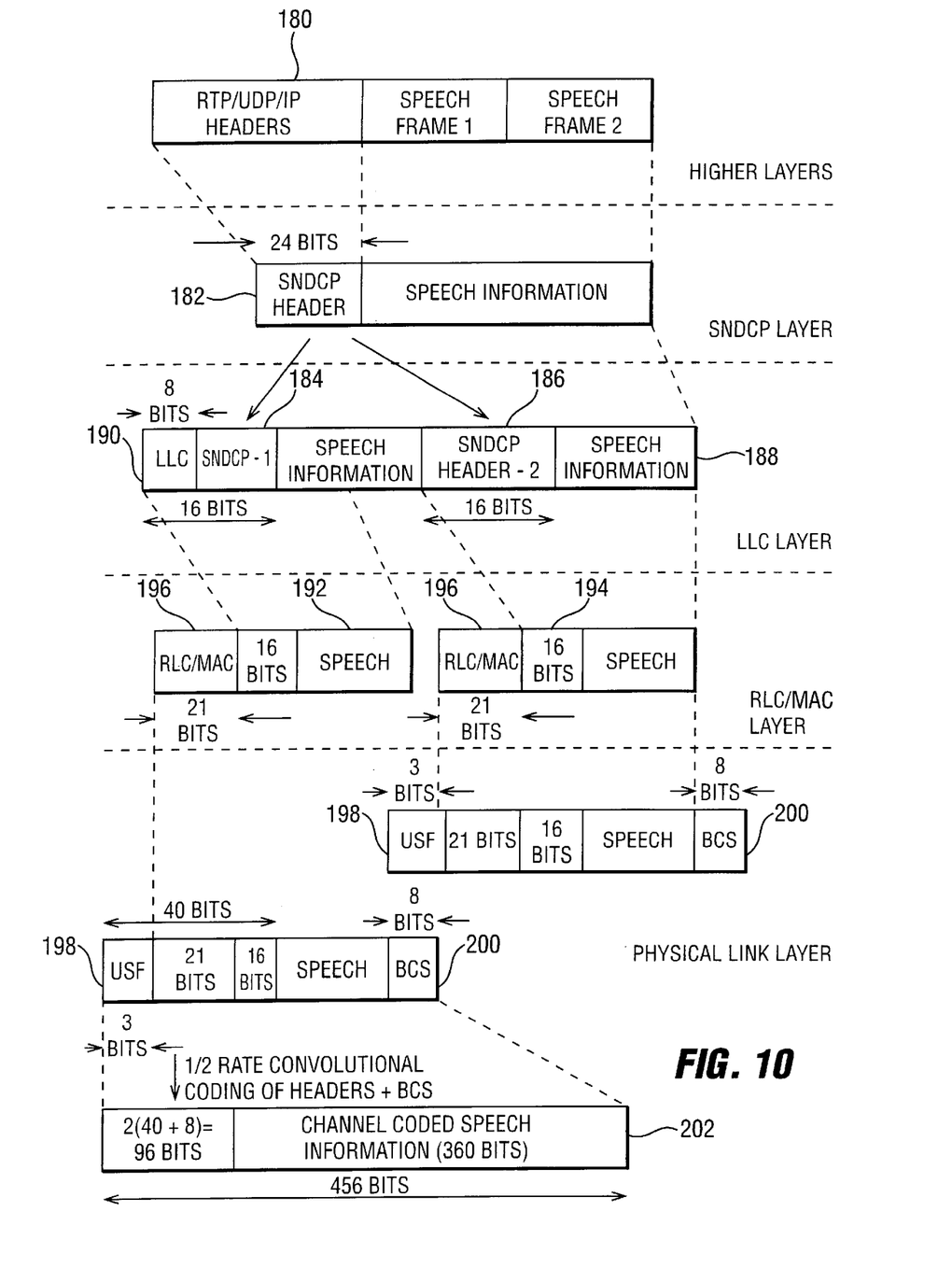
FIG. 10 shows the operation of each layer in the protocol.

FIG. 9 shows how the 244 source coded bits 160 output from the EW codec are protected to varying degrees according to the subjective importance of the bits. Type 1 bits are protected using a half-rate coder identical to that used by the CS-1 scheme, while a subset of 65 bits, including all the Class 1 a bits are protected by means of a cyclic redundancy check (CRC). This is used in order to test for channel conditions. If the CRC check on these 65 bits which represent the subjectively most important bits detects an error, then the receiver considers the speech frame as having suffered an unacceptable degradation in audio quality and consequently drops the frame. In order to maintain a comparable speech quality with that offered by OSM circuit switched services, it is necessary to maintain the same level of channel protection on these bits, because otherwise there would result an increase in the frame dropping rate, with a corresponding decrease in the ensuing speech quality. If the current GPRS coding schemes are to be used, the only scheme which would provide this level of protection is CS-1. This would however protect all bits indiscriminately to the same extent without taking into consideration the subjective weighting of the source-coded bits. Using the CS-I scheme would leave a 181-bit payload, which corresponds to 9.05 kbit/s. However this figure does not take into consideration the headers belonging to the RLC/MAC layer, which as can be seen in FIG. 10, occupy 21 bits. This further reduces the information payload to 160 bits, corresponding to a data throughput of 8 kbit/s adding the LLC and SNDCP headers into the information payload, further reduces the user data throughput to about 5.6 kbit/s, depending on what functionality is included in the headers of those layers.

A far more attractive solution to implementing channel coding within the Voice over GPRS system is to use a channel coding scheme tailored around the requirements of the particular speech coder being used. This allows for the greatest efficiency, by only offering powerful protection to the subjectively most important bits, while offering different levels of channel coding to the remaining bits. This scheme also allows for the headers belonging to the RLC/MAC LLC and SNDCP layers to be powerfully protected. The present solution is to use the CS-I coding scheme to protect those radio block data payload bit positions which are occupied by these higher level headers.

Current coding schemes specify the use of a CRC-based Block Check Sequence (BCS) to detect errors within a radio block. If any such errors are detected, the RLC layer is informed, and retransmission requested, if operating in acknowledged mode. The BCS is also used by the base station subsystem to monitor channel conditions between the mobile stations and the base station. In all coding schemes except CS-I, the length of the BCS is sixteen bits and it operates over the entire length of the radio block. As retransmission is not used in the present voice system, it suffices to be able to detect errors over the section of the data payload used by the protocol headers only. This allows for a reduced-length sequence of 8 bits to be used.

FIG. 10 shows the GPRS system using the enhancements to the protocols as described above. At the SNDCP layer, header compression is carried out on the joint RTP/UDP/IP headers 180 to give a compressed SNDCP header 182 which is only 24 bits long. The SNDC-PDU is then reorganized in such a way that the header is segmented into two sections of differing length 184 and 186, so as to allow for an identical payload format in both transmitted radio blocks. This means that while 8 bits of the SNDCP header are retained at the beginning of the packet, the remaining 16 header bits are placed towards the middle of the packet.

The SNDCP-packet is then encapsulated into an LLC frame 188 with the addition of the new, truncated 8-bit LLC header 190. The RLC/MAC blocks 192, 194 are formed by segmenting the received LLC packet into two. In order to implement the asymmetric buffering described above, the first produced speech frame is forwarded down to the RLC/MAC layer, together with 16 bits of combined SNDCP and LLC headers for immediate forwarding over the radio channel. This is followed 20 ms later by the second segment of the LLC frame, this time containing the remaining 16 bits of the SNDCP header and the contents of the second speech frame. This system ensures that both RLC/MAC blocks have exactly the same layout. At the RLC/MAC layer, a further 21 bits of header 196 are added to both blocks together with a 3 bit USF 198 and a short 8 bit BCS 200. Each block is then channel coded using a new coding scheme optimized for speech, which is referred to as CSS-1 (Coding Scheme-Speech I). Although each speech coding implementation uses a different channel coding scheme, it is assumed that the header information is always powerfully protected using a half-rate code. This leaves 360 bits 202 as a gross speech payload, which is used to contain both the speech information as well as the portion of channel coding for speech only. This translates to a data throughput of 18 bit/s, which is a considerable increase on the 5.6 kbit/s available using the current standards, even when taking into consideration the throughput in the present scheme that has to be used for channel coding.

We claim:

1. A mobile terminal for communicating with a base station in a packet radio services network, said terminal comprising a processor for determining one of a plurality of channels for communication between the mobile terminal and the base station; for digitally coding speech to provide speech information; and for assembling speech information into speech packets; for generating channel allocation requests in which to send speech packets; a radio transmitter for transmitting the requests and the packets to a base station in the network; and a radio receiver for receiving identities of channels allocated by the base station for the mobile terminal to transmit on, said processor being responsive to each received channel allocation to determine that packets are sent on the allocated channel wherein if a request to send is not granted, the processor is arranged to discard speech information until a further request is granted and the further request is delayed by a predetermined period where the delay is increased if successive requests are not granted and where following a predetermined maximum delay, the delay is reduced.

2. A mobile terminal as claimed in claim 1, wherein the processor is arranged to implement a layered protocol, and wherein each packet is given a network and transport layer header in a subnetwork dependent convergence protocol layer (SNDCP).

3. A mobile terminal in accordance with claim 1 further comprising a voice activity detector, wherein the processor is responsive to detection of voice activity by the voice activity detector, to generate a request for a channel allocation in which to send voice packets, and on receipt of a channel identity, to send an address header uncompressed on that channel and subsequently to send packets with compressed headers which do not contain the destination address on the identified channel, until the voice activity detector detects no voice activity.

4. A mobile terminal as claimed in claim 3, wherein the processor is arranged to construct packets of an equal number n of frames, the processor being further arranged to implement a logical link layer protocol (LLC) which adds its own LLC header information comprising a service access point identifier defining speech service to each packet, and to divide the total LLC plus an SNDCP header into n parts of equal length and to place one header part before each frame in the packet.

5. A mobile terminal as claimed in claim 4, wherein in the physical layer, in each frame, the header and the most important bits speech information are coded using a convolutional code, and a subset of important bits of the speech information are coded using a cyclic redundancy check.

* * * * *